No. 744,206. PATENTED NOV. 17, 1903.
G. T. KINCH.
DIPPER OR SKIMMER.
APPLICATION FILED FEB. 12, 1900.
NO MODEL.
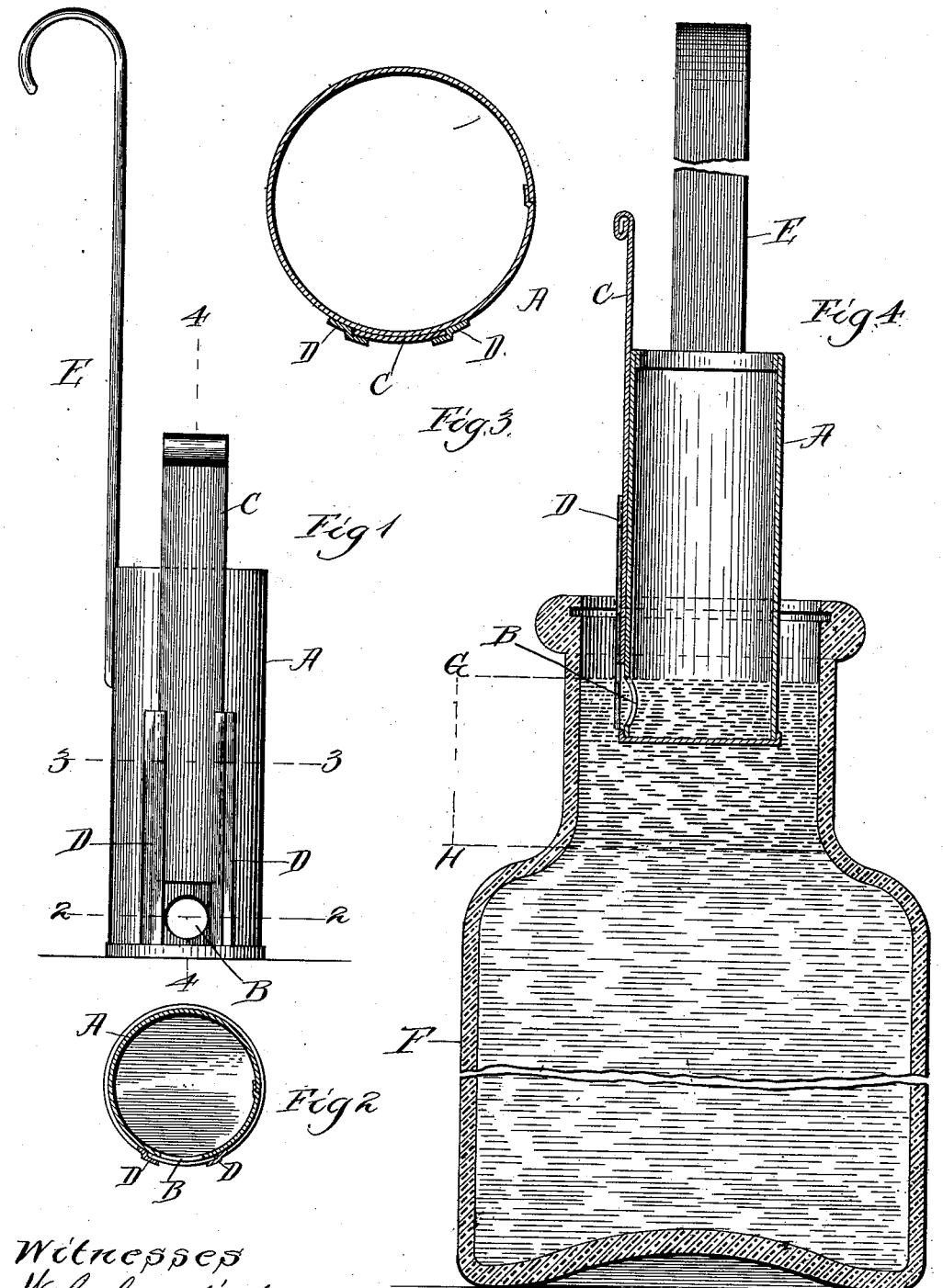
Witnesses
W. C. Corlies
W. H. Colton.
Grant T. Kinch Inventor
By Myron W. Whittemore Atty No. 744,206. Patented November 17, 1903.

UNITED STATES PATENT OFFICE.

GRANT T. KINCH, OF CHICAGO, ILLINOIS.

DIPPER OR SKIMMER.

SPECIFICATION forming part of Letters Patent No. 744,206, dated November 17, 1903.

Application filed February 12, 1900. Serial No. 4,996. (No model.)

*To all whom it may concern:*

Be it known that I, GRANT T. KINCH, a citizen of the United States of America, residing at Chicago, in the county of Cook and State of Illinois, have invented a new and useful Invention in Dippers or Skimmers, of which the following is a specification.

This invention relates to a novel and improved form of milk or cream dipper.

The object of the invention is to provide a means by which the cream or milk may be readily removed from the milk-receptacle—an appliance that can be economically manufactured and readily adjusted.

The invention consists in the matters hereinafter referred to, and more particularly pointed out in appended claim.

The drawings illustrate the embodiments of my invention.

Figure 1 is a side elevation of the dipper with removal slide C and partially raised, showing the opening B, through which the fluid passes. Fig. 2 is a section on line 2 2 of Fig. 1, showing the manner in which the projecting lips D D engage the slide C. Fig. 3 is a section on line 3 of Fig. 1. Fig. 4 is a vertical section on line 4 4 of Fig. 1, showing bottle containing milk and cream, the cream being shown by the heavier dotted lines G H, and also representing the dipper in position to remove the cream.

As shown in said drawings, A represents the dipper in the form of an elongated tube sufficient in size to conveniently enter the neck of the ordinary milk-bottles as used in trade.

C represents a slide or gate moving vertically between the engaged projection D D and closing the aperture B.

In Fig. 1 the dipper or skimmer is represented with the gate C open, exposing the orifice B, in which position the skimmer is inserted in the neck of the bottle F and depressed to the line between the cream G H, which, having raised to the surface of the milk, flows through the orifice B, and when sufficient amount of cream has flowed within the dipper the slide or gate C is pressed downward, closing the orifice B and retaining the cream within the skimmer, when the skimmer is lifted from the bottle.

While the construction herein shown possesses many features of advantage and is an embodiment of my invention, it will be obvious that many changes may be made in the details without departing from the spirit of my invention. The dipper may be varied in form and in size to meet the various exigencies which may arise in different forms and shapes of bottles or receptacles for holding milk and may be constructed of tin, aluminium, galvanized iron, nickel, or any similar material. The relative dimensions may also be changed without materially affecting the merits of my invention.

I claim as my invention—

A dipper or skimmer, comprising a cylinder having an opening in one side near its lower edge, a cap-bottom secured to and surrounding the lower edge of the cylinder, a pair of guides secured to the sides of the cylinder upon each side of the opening and providing a space between the sides and the under side of the guides, and a slide or gate provided with a handle mounted between said guides to control the opening and always have its handle above the cylinder.

GRANT T. KINCH.

Witnesses:
M. W. WHITTEMORE,
GEORGE W. SNYDER.